(12) United States Patent
Dvorkin

(10) Patent No.: US 9,188,477 B2
(45) Date of Patent: Nov. 17, 2015

(54) RADAR SYSTEM AND METHOD FOR PROVIDING INFORMATION ON MOVEMENTS OF OBJECT'S SURFACE

(75) Inventor: Vladimir Dvorkin, Castro Valley, CA (US)

(73) Assignee: Linear Technology Corporation, Milpitas, CA (US)

( * ) Notice: Subject to any disclaimer, the term of this patent is extended or adjusted under 35 U.S.C. 154(b) by 873 days.

(21) Appl. No.: 13/315,654

(22) Filed: Dec. 9, 2011

(65) Prior Publication Data

US 2013/0044020 A1 Feb. 21, 2013

Related U.S. Application Data

(60) Provisional application No. 61/524,945, filed on Aug. 18, 2011.

(51) Int. Cl.
| | |
|---|---|
| *G01S 13/56* | (2006.01) |
| *G01S 13/88* | (2006.01) |
| *G01H 1/00* | (2006.01) |
| *G01S 13/50* | (2006.01) |
| G01S 13/536 | (2006.01) |
| G01S 13/58 | (2006.01) |

(52) U.S. Cl.
CPC .............. *G01H 1/003* (2013.01); *G01S 13/50* (2013.01); *G01S 13/88* (2013.01); *G01S 13/536* (2013.01); *G01S 13/56* (2013.01); *G01S 13/583* (2013.01)

(58) Field of Classification Search
CPC ....... G01S 13/50; G01S 13/536; G01S 13/56; G01S 13/583; G01S 13/88
USPC ........ 342/27, 28, 104, 109, 118, 128; 324/96; 702/54, 56, 75, 76; 73/570
See application file for complete search history.

(56) References Cited

U.S. PATENT DOCUMENTS

| | | | | |
|---|---|---|---|---|
| 3,019,430 | A | * | 1/1962 | Pedersen et al. ................. 342/83 |
| 4,131,889 | A | * | 12/1978 | Gray .............................. 342/114 |
| 4,413,519 | A | * | 11/1983 | Bannister et al. ................ 73/660 |
| 4,450,445 | A | * | 5/1984 | Conner et al. .................. 342/84 |
| 4,481,825 | A | * | 11/1984 | Kljuev et al. ................... 73/655 |
| 4,507,658 | A | * | 3/1985 | Keating ........................ 342/118 |

(Continued)

FOREIGN PATENT DOCUMENTS

| | | |
|---|---|---|
| WO | WO-95/35484 A1 | 12/1995 |
| WO | WO-97/22891 A1 | 6/1997 |

OTHER PUBLICATIONS

Extended European Search Report issued in European Patent Application No. 12004632.1 dated Nov. 13, 2012.

*Primary Examiner* — Peter Bythrow
(74) *Attorney, Agent, or Firm* — McDermott Will & Emery LLP

(57) ABSTRACT

A system for producing an output signal representing movement of an object's surface has a continuous wave (CW) signal source for producing an CW signal directed at the object's surface. The CW signal is produced at a first frequency. A receiving element receives a signal reflected from the object's surface when the CW signal hits this surface. A down-converting frequency mixer converts the received signal into a signal of a second frequency lower than the first frequency. The frequency mixer is configured to produce an output signal representing an amplitude-modulated (AM) component of the received signal and having a parameter representing movement of the object's surface.

26 Claims, 3 Drawing Sheets

(56) References Cited

U.S. PATENT DOCUMENTS

| | | | | |
|---|---|---|---|---|
| 4,573,358 | A * | 3/1986 | Luongo | 73/660 |
| 4,887,468 | A * | 12/1989 | McKendree et al. | 73/660 |
| 4,934,192 | A * | 6/1990 | Jenkins | 73/660 |
| 5,206,816 | A * | 4/1993 | Hill et al. | 702/56 |
| 5,479,826 | A * | 1/1996 | Twerdochlib et al. | 73/660 |
| 5,760,731 | A * | 6/1998 | Holmes | 342/118 |
| 5,966,090 | A * | 10/1999 | McEwan | 342/27 |
| 6,426,716 | B1 * | 7/2002 | McEwan | 342/28 |
| 6,545,762 | B2 * | 4/2003 | Lewis et al. | 356/502 |
| 7,073,384 | B1 * | 7/2006 | Donskoy et al. | 73/657 |
| 7,095,221 | B2 * | 8/2006 | Bosselmann et al. | 324/71.1 |
| 7,825,669 | B2 * | 11/2010 | Parsons et al. | 324/644 |
| 7,848,896 | B2 * | 12/2010 | Li et al. | 702/56 |
| 7,889,119 | B2 * | 2/2011 | Evers et al. | 342/118 |
| 7,969,165 | B2 * | 6/2011 | Bosselmann et al. | 324/644 |
| 8,120,522 | B2 * | 2/2012 | Tralshawala et al. | 342/25 F |
| 8,256,297 | B2 * | 9/2012 | Sue et al. | 73/643 |
| 8,276,451 | B2 * | 10/2012 | Tyren | 73/597 |
| 8,454,528 | B2 * | 6/2013 | Yuen et al. | 600/534 |
| 2006/0048581 | A1 * | 3/2006 | Bosselmann et al. | 73/781 |
| 2008/0074307 | A1 * | 3/2008 | Boric-Lubecke et al. | 342/28 |
| 2008/0300805 | A1 * | 12/2008 | Li et al. | 702/56 |
| 2009/0188324 | A1 * | 7/2009 | Gregory et al. | 73/773 |
| 2010/0026559 | A1 * | 2/2010 | Siegel | 342/159 |
| 2010/0117891 | A1 * | 5/2010 | Utagawa et al. | 342/175 |
| 2010/0319457 | A1 * | 12/2010 | Tyren | 73/649 |

* cited by examiner

RADAR SYSTEM AND METHOD FOR PROVIDING INFORMATION ON MOVEMENTS OF OBJECT'S SURFACE

This application claims priority of U.S. provisional patent application No. 61/524,945 entitled "RADAR SYSTEM AND METHOD FOR PROVIDING INFORMATION ON MOVEMENTS OF OBJECT'S SURFACE," filed on Aug. 18, 2011 and incorporated herein by reference.

TECHNICAL FIELD

This disclosure relates to radar systems, and more particularly, to a radar for producing a signal representing movements of an object's surface, such as rotation of a power generator's shaft or vibration of a vibrating surface.

BACKGROUND ART

Movements of an object's surface may be analyzed, for example, to measure the free play in a shaft of a power generator or electric motor. A conventional system for measuring the free play in a shaft is based on a proximity detector that uses a free running LC oscillator. However, such proximity detectors need to be placed very close to the shaft's surface. This may result in the damage to the proximity detectors in case of significant free play of the shaft.

There is a need for a new system capable of providing information accurately representing movements of an object's surface, that may be arranged at greater distances from the object's surface.

SUMMARY OF THE DISCLOSURE

In accordance with one aspect of the present disclosure, a system for producing an output signal representing movement of an object's surface is offered. This system involves a continuous wave (CW) signal source that produces an CW signal directed at the object's surface. A receiving element, such as an antenna element, receives a signal reflected from the object's surface when the CW signal hits this surface. The CW signal may be produced at a first frequency, for example, in a radio frequency (RF) range.

The signal received by the receiving element includes an amplitude-modulated (AM) component having the amplitude representing movement of the object's surface. Also, the frequency of the AM component may represent this movement. A down-converting frequency mixer converts the received signal into a signal of a second frequency lower than the first frequency. The frequency mixer is configured to produce an output signal representing an AM component of the received signal and having a parameter, such as amplitude or frequency, representing movement of the object's surface. For example, the frequency mixer may have a local oscillator (LO) port for receiving a coherent LO injection from the CW signal source so as to produce an output signal representing the AM component. The output signal of the mixer may be a baseband (BB) signal representing an envelope of the RF reflected signal.

A frequency filter is coupled to the output of the frequency mixer for filtering the output signal of the mixer so as to produce a filtered signal within a predetermined bandwidth. For example, the frequency filter may be a low pass filter or a band pass filter.

The filtered signal may be amplified by an output amplifier, such as a BB amplifier, and further filtered by an additional frequency filter, such as a low pass filter.

In one exemplary embodiment of the disclosure, the CW signal may be directed at a rotating shaft of an electric power generator or electric motor. In this case, the system produces the output signal that may provide information on the free play in the shaft.

In another exemplary embodiment, the CW signal may be directed at a vibrating surface. In this case, the system produces the output signal that may be used for detecting vibration of the vibrating surface and determining the profile of the vibration.

In accordance with one exemplary embodiment, a single antenna may be provided for directing the CW signal at the object's surface and for receiving the reflected signal. For example, a microstrip patch antenna may be used as a transmitting and receiving antenna. Via an antenna coaxial cable, a directional coupler may be coupled to the antenna for supplying a transmit CW signal from the CW signal source to the antenna and for providing a receive signal from the antenna to the frequency mixer. The directional coupler separates signals based on directions of their propagation. For example, the directional coupler may have main ports for supplying the transmit signal to the antenna, and a coupled port for supplying the receive signal from the antenna to the frequency mixer. A two-way splitter may be provided at the output of the CW signal source to supply the transmit CW signal to the directional coupler, and to provide the coherent LO injection to the LO port of the frequency mixer.

Alternatively, separate transmit and receive antennas may be arranged for transmitting the CF signal and for receiving the reflected signal.

A root mean square (RMS) power detector or a log detector may be provided for determining a forward RF power.

In accordance with another aspect of the present disclosure, a method of providing information on movement of an object involves directing a CW signal at the object and receiving a signal reflected from the object. The received signal is down converted so as to produce a signal representing an AM component of the reflected signal. The signal representing the AM component is further processed to analyze information on the object's movement carried by the amplitude and/or frequency of the AM component. The frequency of the received signal may be down converted based on a local oscillator signal coherent with the CW signal directed at the object.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

Figure 1:
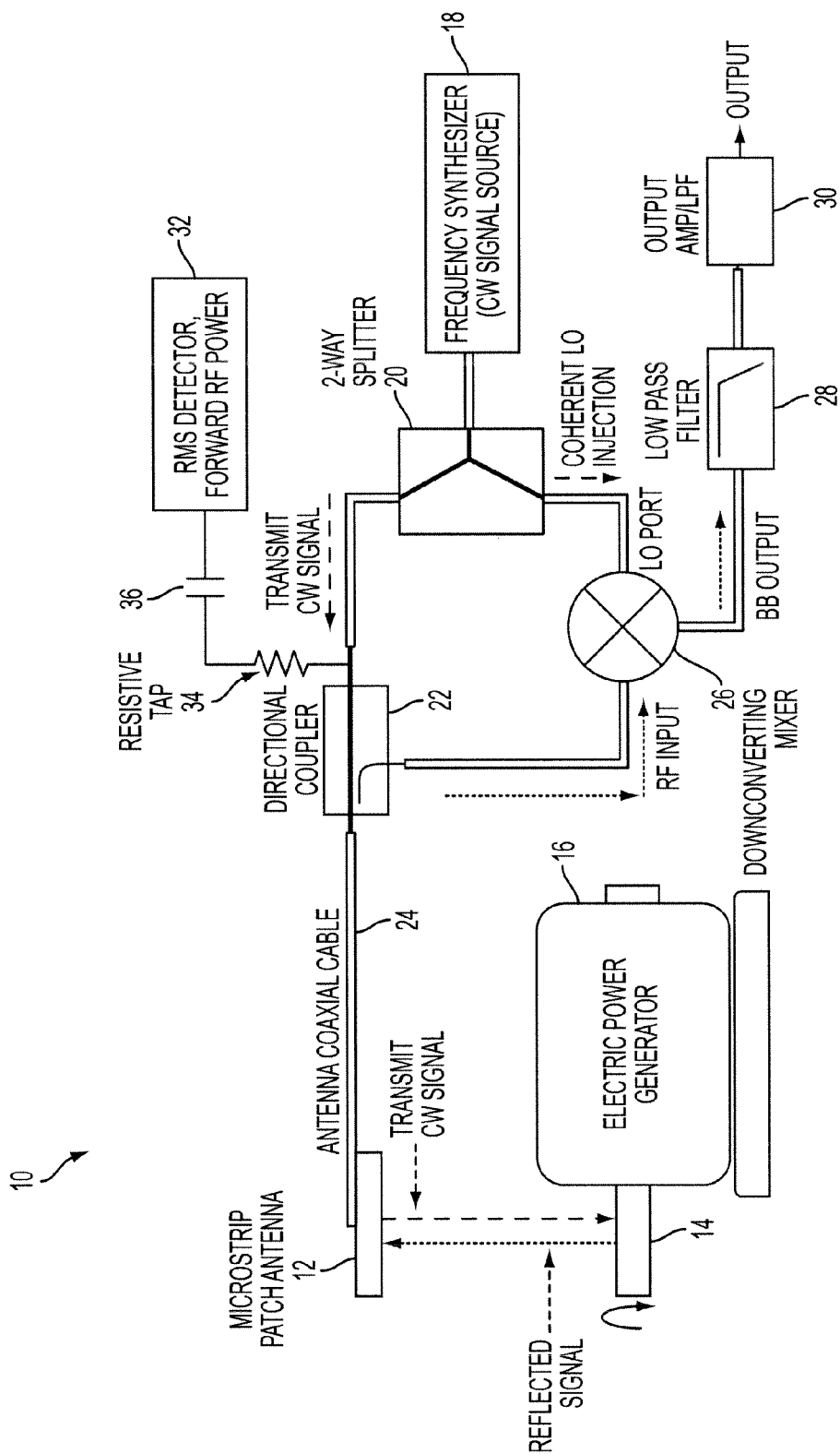
FIG. 1 shows an exemplary embodiment of a system for producing a signal representing movement of an object's surface in accordance with the present disclosure.

The present disclosure will be made using the specific example presented below. It will become apparent, however, that the concept of the disclosure is applicable to producing a signal representing any movement of any object's surface. FIG. 1 shows a radar system 100 including an antenna 12, such as a microstrip patch antenna. The antenna 12 may be configured for radiation a transmit continuous wave (CW) signal directed to a surface of an object 14, such as a rotating shaft of an electric power generator 16. For example, the antenna 12 may produce a 5.8 GHz transmit CW signal at 10 mW. The antenna 12 may be positioned at a distance of 11 mm or greater from the object 14.

The antenna 12 is fed by CW transmit signals produced by a CW signal source 18, such as a frequency synthesizer or a free running RF/microwave oscillator. The transmit CW signal from the CW signal source 18 propagates to the antenna 12 via a 2-way splitter 20, a directional coupler 22 and an antenna coaxial cable 24.

A reflected signal produced when the transmit CW signal hits the surface of the object 14, is received by the antenna 12. The reflected signal includes amplitude modulated (AM) components having the amplitude and frequency that represent the movement of the object's surface. For example, the AM component may be in a form of a low frequency envelope of a radio frequency (RF) reflected signal.

Via the antenna coaxial cable 24 and the directional coupler 22, the receive signal from the antenna 12 is supplied to a down-converting frequency mixer 26. The directional coupler 22 separates signals based on the direction of their propagation. In particular, the directional coupler 22 separates the receive signal that propagates from the antenna 12, from the transmit CW signal that propagates to the antenna 12. For example, the directional coupler 22 may have main ports for propagating the transmit CW signal to the antenna 12, and a coupled port for propagating the receive signal in the opposite direction.

The down-converting frequency mixer 26 converts a high frequency receive signal into a lower frequency signal, such as a baseband (BB) signal representing an envelope of the RF reflected signal. For example, the mixer 26 may have an RF input port for receiving an RF input signal from the directional coupler 22, and a local oscillator (LO) port for receiving a coherent LO injection from the 2-way splitter 20. The CW signal from the CW signal source 18 is supplied to the 2-way-splitter 20 that splits the CW signal into the transmit CW signal that propagates to the directional coupler 22, and the LO injection coherent with the transmit CW signal.

The frequency mixer 26 mixes a high frequency signal reflected from the surface of the object 14 with the coherent LO injection. An output signal produced by the frequency mixer 26 represents the reflected signal's AM components. The amplitude and/or frequency of the output signal corresponding to the amplitude and/or frequency of the reflected signal's AM components may give information on the movement of the object's surface. For example, the frequency mixer 26 may provide heterodyning to produce a low frequency envelope of the high frequency reflected signal. The amplitude and/or frequency of the low frequency envelope give an exact representation of the object's movement.

The output signal of the mixer 26 may be filtered by a frequency filter 28, such as a low pass filter (LPF) or a band pass filter, to produce a filtered signal having the frequency within a predetermined band.

To facilitate the analysis of the information provided by the produced output signal, the filtered signal from the filer 28 may be further amplified and/or filtered by an output amplifier/filter 30. For example, a BB signal amplifier and/or an LPF may be used for further signal processing. An appropriate signal analyzer (not shown) may be coupled to the output amplifier/filter 30 to enable an operator to determine a predetermined parameter of the output signal that provides information on the movement of the object 16. Alternatively, an automatic signal analyzer may be employed to provide appropriate signals representing parameters determined based on analyzed movements of the object 16.

Also, a root mean square (RMS) detector 32 may be coupled via a resistive tap 34 and a capacitor 36 to the directional coupler 22 so as to receive the transmit CW signal in order to determine a forward RF power. As one skilled in the art would realize the forward RF power characterizes the forward wave on the transmission line that transfers the transmit CW signal.

Figure 2:
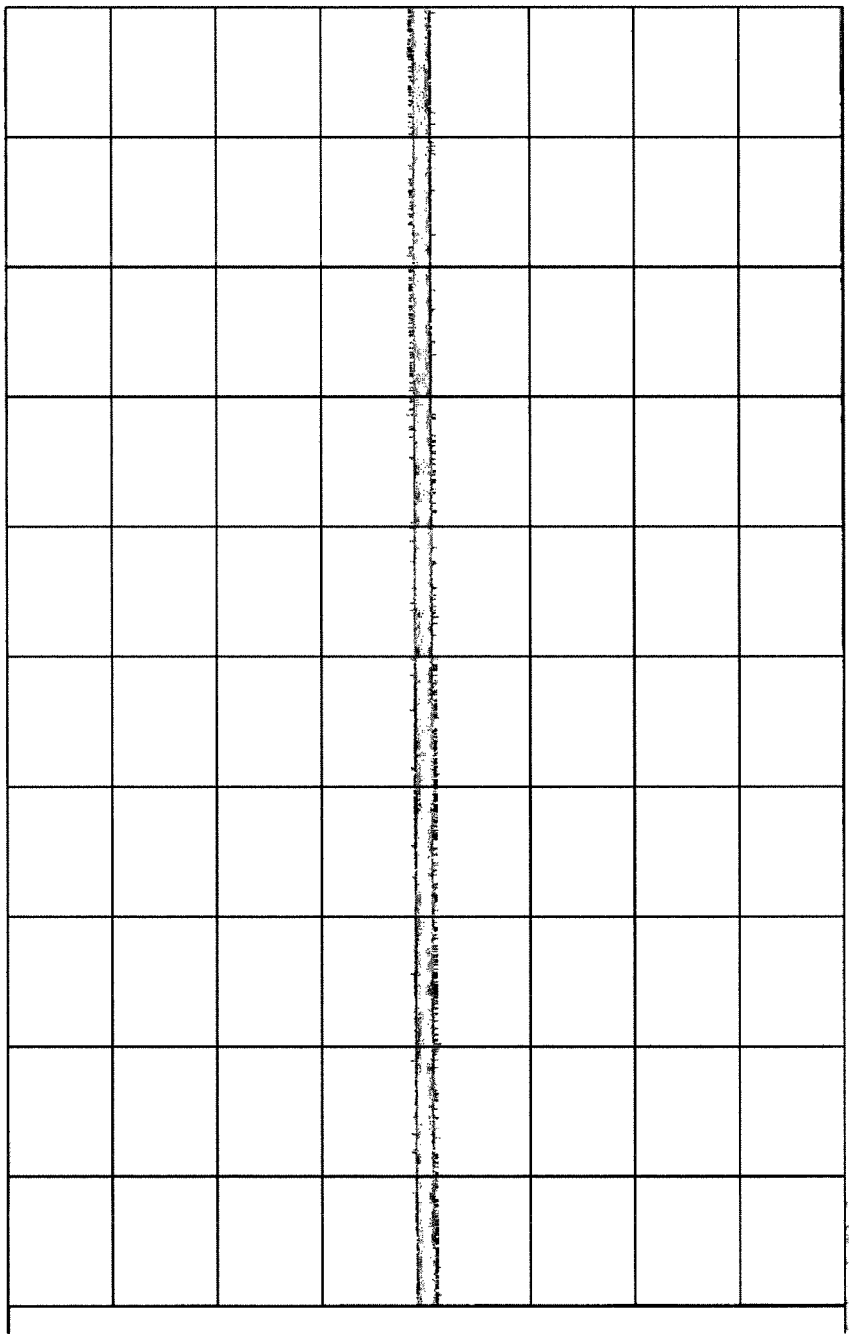
FIGS. 2 and 3 illustrate examples of signals produced by the system of the present disclosure.
Figure 3:
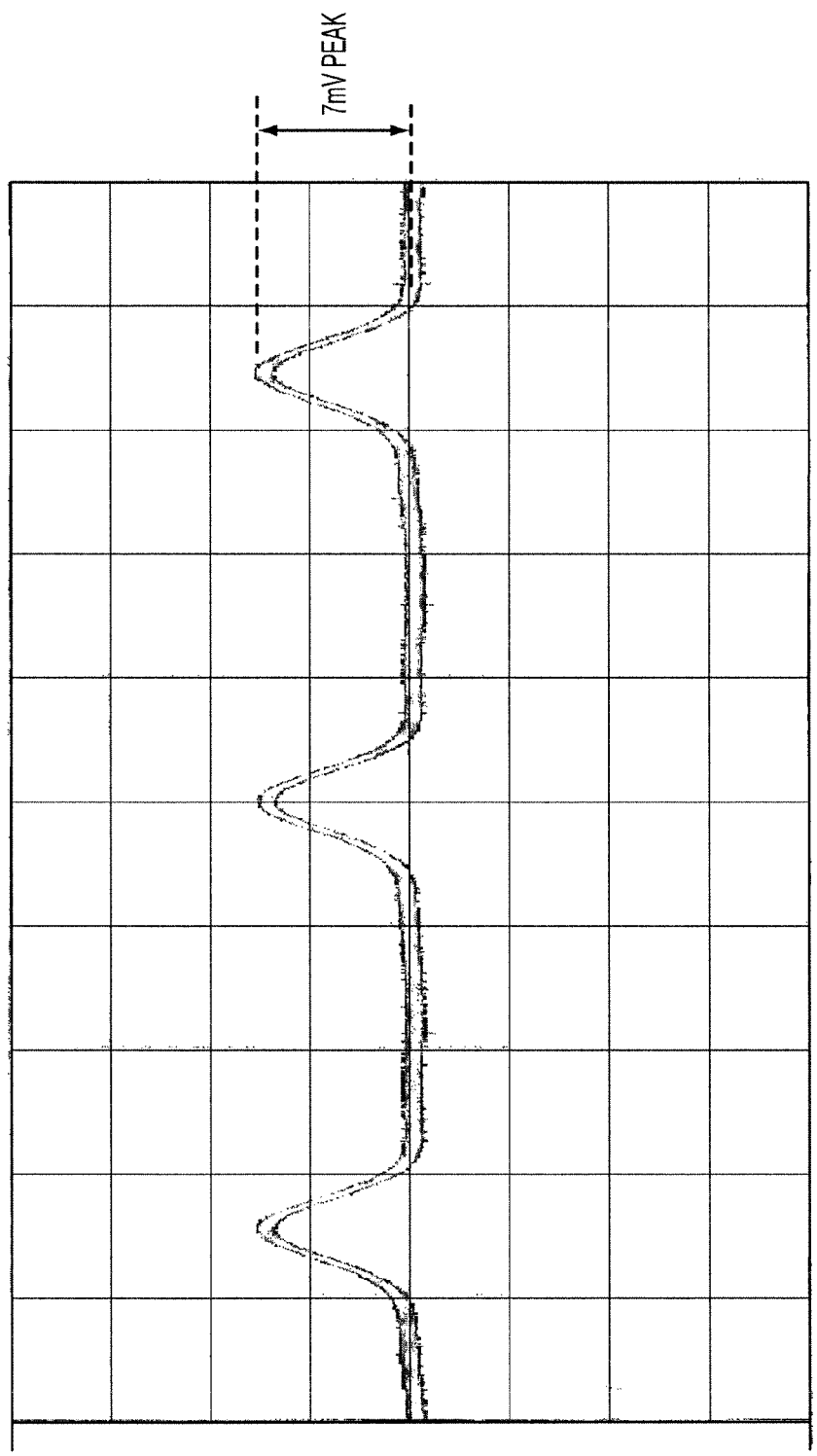

FIGS. 2 and 3 illustrate exemplary signals produced by the system 100 and displayed on a screen of a signal analyzer, such as an oscilloscope, that may be coupled to the output of the low pass filter 28. The amplitude and/or frequency of this signal may be analyzed to obtain information on the movement of the object's surface.

The signal produced by the system 100 may be used to determine the free play of a rotating shaft in an electric power generator or electric motor. For example, FIG. 2 shows an exemplary signal at the output of the low pass filter 28 produced when the antenna 12 is arranged at a distance of 11 mm from the shaft 14. The signal in FIG. 2 has a shape of a substantially straight line indicating that there is no free play in the shaft 14. FIG. 3 shows another exemplary signal at the output of the low pass filter 28 produced when the antenna 12 is arranged at a distance of 11 mm from the shaft 14. The signal in FIG. 3 has a strong AM component representing the envelope of the reflected RF signal. In the example shown in FIG. 3, the amplitude of the AM component is equal to 7 mV indicating a tiny free play in the shaft 14.

Also, the system 100 may be used to provide information on vibrations of a vibrating surface. For example, the signal produced by the system 100 may be used to detect vibrations and to indicate a profile of vibrations.

The system 100 in FIG. 1 uses a single antenna 12 for both transmitting and receiving signals. However, as one skilled in the art would realize, separate transmit and receive antennas may be provided for radiating the transmit CW signals and for receiving the signal reflected from the surface of the object 14. In such an embodiment, the directional coupler 22 is not required because transmit and receive signal paths are separate.

The radar system of the present disclosure utilizes frequency down-conversion of RF signals so as to determine information on object's movements based on lower frequency signals. Such a system provides good immunity from RF interference and also provides a high sensitivity that makes it possible to provide more accurate information on object's movements.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A system for producing an output signal representing movement of an object's surface, comprising:
    a continuous wave (CW) signal source for producing an CW signal directed at the object's surface, the CW signal being produced at a first frequency,
    a receiving element for receiving a signal reflected from the object's surface when the CW signal hits this surface, and
    a down-converting frequency mixer for converting the received signal into a signal of a second frequency lower than the first frequency, the frequency mixer being configured to produce an output signal representing an AM component of the received signal and having a parameter representing movement of the object's surface,
    wherein the frequency mixer comprises a local oscillator (LO) port for receiving a coherent LO injection from the CW signal source to produce the output signal representing the AM component of the received signal, and
    an amplitude of the output signal corresponding to an amplitude of the AM component of the received signal represents movement of the object's surface.

2. The system of claim 1, wherein the first frequency is in a radio frequency (RF) range.

3. The system of claim 2, wherein the output signal of the mixer is a baseband (BB) signal.

4. The system of claim 2, wherein the output signal of the mixer represents an envelope of the received signal.

5. The system of claim 1, wherein the receiving element includes an antenna element.

6. The system of claim 1, further comprising a frequency filter coupled to the output of the frequency mixer for filtering the output signal of the mixer to produce a filtered signal within a predetermined bandwidth.

7. The system of claim 6, wherein the frequency filter is a low pass filter.

8. The system of claim 6, wherein the frequency filter is a band pass filter.

9. The system of claim 6, further comprising an output amplifier for amplifying the filtered signal.

10. The system of claim 9, wherein the output amplifier is a BB amplifier.

11. The system of claim 9, further comprising an additional frequency filter for further filtering the filtered signal amplified by the output amplifier.

12. The system of claim 11, wherein the additional frequency filter is a low pass filter.

13. The system of claim 1, wherein the CW signal source is configured for directing the CW signal at a rotating shaft of an electric power generator or electric motor.

14. The system of claim 13, wherein the frequency mixer is configured to produce the output signal providing information on free play in the shaft.

15. The system of claim 1, wherein the CW signal source is configured for directing the CW signal at a vibrating surface.

16. The system of claim 15, wherein the frequency mixer is configured to produce the output signal for detecting vibration of the vibrating surface.

17. The system of claim 15, wherein the frequency mixer is configured to produce the output signal for determining a vibration profile of the vibrating surface.

18. The system of claim 1, wherein a single antenna is provided for directing the CW signal at the object's surface and for receiving the reflected signal.

19. The system of claim 18, wherein the antenna includes a microstrip patch antenna.

20. The system of claim 18, further comprising a directional coupler coupled to the antenna via an antenna coaxial cable for supplying a transmit CW signal from the CW signal source to the antenna and for providing a receive signal from the antenna to the frequency mixer.

21. The system of claim 20, wherein the directional coupler is configured to separate signals based on directions of their propagation.

22. The system of claim 21, wherein the directional coupler has main ports for supplying the transmit signal to the antenna, and a coupled port for supplying the receive signal from the antenna to the frequency mixer.

23. The system of claim 20, further comprising a two-way splitter provided at an output of the CW signal source to supply the transmit CW signal to the directional coupler, and to provide the coherent LO injection to the LO port of the frequency mixer.

24. The system of claim 1, wherein separate transmit and receive antennas are arranged for transmitting the CW signal and for receiving the reflected signal.

25. The system of claim 1, further comprising a root mean square (RMS) power detector responsive to the CW signal directed at the object's surface, for determining a forward RF power.

26. A method of providing information on movement of an object, comprising the steps of:
    directing a CW signal produced by a continuous wave (CW) signal source, at the object and receiving a signal reflected from the object, and
    down converting frequency of the received signal using a down-converting frequency mixer so as to produce an output signal representing an AM component of the reflected signal,
    wherein the frequency mixer is supplied with a coherent LO injection from the CW signal source to produce the output signal representing the AM component of the reflected signal, and
    an amplitude of the output signal corresponding to an amplitude of the AM component of the reflecting signal provides information on the movement of the object.

* * * * *